United States Patent [19]

Maruoka et al.

[11] Patent Number: 5,252,395
[45] Date of Patent: Oct. 12, 1993

[54] BLISTER RESISTANT PRESSURE SENSITIVE ADHESIVE SHEET

[75] Inventors: Shigenobu Maruoka, Kawasaki; Toshio Sugizaki; Kouji Irie, both of Urawa; Ichiro Tsuchida, Koshigaya; Takanori Saito, Misato, all of Japan

[73] Assignee: Lintec Corporation, Tokyo, Japan

[21] Appl. No.: 792,013

[22] Filed: Nov. 13, 1991

[30] Foreign Application Priority Data

Dec. 17, 1990 [JP] Japan .................... 2-411182

[51] Int. Cl.$^5$ .............................................. C09J 7/02
[52] U.S. Cl. .................................... 428/355; 525/288; 525/301; 526/279
[58] Field of Search ............... 428/355, 352; 525/283, 525/288, 301; 526/279

[56] References Cited

U.S. PATENT DOCUMENTS

| | | | |
|---|---|---|---|
| 3,786,116 | 1/1974 | Milkovich | 525/301 |
| 3,879,494 | 4/1975 | Milkovich | 525/301 |
| 4,104,330 | 8/1978 | Danzig | 525/301 |
| 4,551,388 | 11/1985 | Schlademan | 428/355 |
| 4,693,935 | 9/1987 | Mazurek | 428/352 |

FOREIGN PATENT DOCUMENTS

| | | |
|---|---|---|
| 0304779 | 3/1989 | European Pat. Off. . |
| 56-59882 | 5/1981 | Japan . |
| 59-75975 | 4/1984 | Japan . |
| 63-196676 | 8/1988 | Japan . |
| 1-146977 | 6/1989 | Japan . |
| 1-203412 | 8/1989 | Japan . |

OTHER PUBLICATIONS

Mancinelli, "Macromonomers Lead to Acrylic Hot Melt and Solvent PSAs", Sep. 1985, pp. 17-21, Adhesives Age.

"Polymer Alloys", edited by Society of Polymer Science, Japan, Tokyo, Kagaku Dojin 1981, pp. 312-338 (and English language Abstract thereof).

Speical Edition: Functional Elastomers, Nippon Gomu Kyokaishi, vol. 59, 1986, pp. 331-339 (and English language Abstract thereof).

*Primary Examiner*—Jenna L. Davis
*Attorney, Agent, or Firm*—Frishauf, Holtz, Goodman & Woodward

[57] ABSTRACT

A pressure sensitive adhesive sheet comprising a substrate and an adhesive composition which is coated on the surface of the substrate. The main components of the adhesive composition are (a) a copolymer comprising monomeric units of an acrylic ester, (b) monomeric units of a polar acrylic compound, (c) monomeric units of a high glass transition temperature (Tg) macromonomer having a Tg of 20° C. or above, (d) monomeric units of a low Tg macromonomer having a Tg of below 20° C. and (e) monomeric units of an oligomer having telechelic thiol functional groups. The pressure sensitive adhesive sheet has excellent adhesive strength, resistance against formation of blisters and removability upon heating.

20 Claims, No Drawings

BLISTER RESISTANT PRESSURE SENSITIVE ADHESIVE SHEET

BACKGROUND OF THE INVENTION

1. Field of the Invention

The present invention relates to a novel blister resistant pressure sensitive adhesive sheet. More particularly, the present invention relates to a novel blister resistant pressure sensitive adhesive sheet which has excellent resistance to formation of blisters and excellent removability on heating and after heating and is suitably applied to molded plastic products, preferably to polycarbonate plates.

2. Description of the Prior Art

As is well known, pressure sensitive adhesive sheets having a coating layer of a pressure sensitive adhesive are widely used and now indispensable in a variety of industrial fields, for example, as a printed label, seal on wrapped packages and the like. This is because the pressure sensitive adhesive sheets can be readily bonded to the surface of various substrates conveniently by merely putting on and lightly pressing to the substrate surface and, different from adhesives in general, the pressure sensitive adhesive forming the coating layer of the sheet contains no organic solvent so that no problem of environmental pollution are caused thereby.

Pressure sensitive adhesive sheets can be applied and bonded to the surface of a substrate article of any materials almost without limitation including paper, wood, metals, ceramics, plastics and the like. As a consequence of the trend in recent years that light weight articles are preferred, the quantity of plastic products is rapidly increasing year by year. Thus, the occasion in which pressure sensitive adhesive sheets are attached to plastic goods or plastic packages of goods as a label is also increasing rapidly. When a transparent pressure sensitive adhesive sheet used in such an application has a printed pattern as desired, the plastic article to which such sheet is attached on the surface may have an outer appearance as if it were printed directly thereon.

Apart from the application as a label or seal of packages, pressure sensitive adhesive sheets are sometimes attached to the surface of a board of polycarbonate resins used as a window pane by virtue of the high transparency with an object to protect the surface from scratches or to adjust transmission of sun light therethrough.

Pressure sensitive adhesive sheets in general have a serious problem that, when a pressure sensitive adhesive sheet is applied and bonded to the surface of an article made of polystyrene resin, polycarbonate resin and the like, so-called blisters are not rarely formed due to incomplete squeeze out of the gas between the substrate surface and the pressure sensitive adhesive sheet attached as a label or a protecting sheet. This problem has been unavoidable when the face stock film of the pressure sensitive adhesive sheet is made of a resin having gas barrier property such as conventional polyester resins.

When blisters are caused in the presence sensitive adhesive sheet attached to the surface of an article as a label, not only the article has a very unsightly appearance to decrease the commercial value but also the label and the like attached to the surface are liable to eventual falling. In a printed label made of a see-through pressure sensitive adhesive sheet, in particular, it is unavoidable that the appearance is extremely poor because the layer of the adhesive coating exhibits a pockmarked or white and cloudy appearance through the face-stock film.

The mechanism of this undesirable phenomenon is that the plastic film as the face stock film of the pressure sensitive adhesive sheet acts as a barrier against escape of the gas in a small volume occurring between the face stock film and adhesive coating layer so that the gas retained there forms a number of gas-filled blisters.

One of the possible means to solve this problem by dissipating the gas in the blisters is to provide a gas permeable layer made of paper, porous polyurethane and the like between the face stock film and the adhesive coating layer of the pressure sensitive adhesive sheet. This method, however, has no general applicability because the overall thickness of the pressure sensitive adhesive sheet is necessarily increased so much and the pressure sensitive adhesive sheet can no longer be used as a see-through label due to the loss of transparency by the interposed gas permeable layer.

It is also known that the problem due to the formation of blisters in a pressure sensitive adhesive sheet can be considerably decreased when an adhesive of a certain type is used for the adhesive coating layer. Examples of such an adhesive hitherto proposed include those rubber-based ones comprising a block copolymer of styrene-isoprene-styrene type compounded in a specific formulation. Pressure sensitive adhesive sheets having an adhesive coating layer of such a rubber-based adhesive are, however, not quite satisfactory because of the poor weatherability of the adhesive layer inherent in rubber-based pressure sensitive adhesives.

It has been known for a long time that novel functions can be exhibited by a polymer by grafting a different kind of polymer to the main chain of the polymer ("Polymer Alloys", edited by the Society of Polymer Science, Japan and published by Tokyo Kagaku Dojin in 1981; and Nippon Gomu Kyokaishi, Volume 59, Page 331, 1986).

In the field of adhesive materials, adhesives having well balanced adhesive properties, such as tackiness, adhesive strength and holding power, can be prepared by using as the main component thereof a copolymer having a main chain of acrylic units and side chains of a high glass transition temperature (Tg) grafted to the main chain. One of the methods of grafting the side chains is reaction of functional groups attached to the main chain with a polymer which is of different kind from the main chain and has reactive terminal functional groups with the functional groups of the main chain (Laid-open Japanese Patent Publication Showa 56-59882). Another of the methods of grafting the side chain is a method of using macromonomers (Laid-open Japanese Patent Publication Showa 59-75975; U.S. Pat. No. 4,551,388; and Adhesive Age, Volume 28, No. 9, Page 17, (1985)).

Macromonomers having a Tg of below 0° C. can be utilized in the method of using macromonomers (Laid-open Japanese Patent Publication Showa 62-288676; Laid-open Japanese Patent Publication Showa 63-196676; Laid-open Japanese Patent Publication Heisei 1-146977; and Laid-open Japanese Patent Publication Heisei 1-203412) as well as the macromonomer having a Tg of above room temperature which is described above.

The present inventors previously studied extensively to develop pressure sensitive adhesive sheets having excellent adhesive strength and excellent resistance against formation of blisters simultaneously and it was discovered that a pressure sensitive adhesive sheet comprising a coating layer which comprises as the main component thereof a copolymer having a specific molecular weight and a specific Tg and comprising monomer units of acrylic ester, monomer units of polar acrylic compound and macromonomer units having polymeric chain and terminal polymerizable functional groups in a specific ratio is suitable for the object.

In practical applications of pressure sensitive adhesive sheets, it is also very important that, when necessary, the pressure sensitive adhesive sheets are easily removed from the surface of the substrate to which they are applied without any remaining adhesive material on the substrate. Heating is one of the practical methods to facilitate the removal of pressure sensitive adhesive sheets and it is important that pressure sensitive adhesive sheets have excellent removability on heating and after heating.

The pressure sensitive adhesive sheet thus discovered previously by the present inventors does not always have satisfactory removability on heating and after heating even though it has excellent adhesive strength and excellent resistance against formation of blisters simultaneously.

SUMMARY OF THE INVENTION

The present invention accordingly has an object to provide a pressure sensitive adhesive sheet having excellent adhesive strength, resistance against formation of blisters and removability on heating and after heating simultaneously.

Thus, the blister resistant pressure sensitive adhesive sheet of the invention comprises a substrate and an adhesive composition which is coated on the surface of the substrate and comprises as the main component thereof a copolymer comprising (A) 30 to 93 weight percent of monomeric units of an acrylic ester, (B) 1 to 30 weight percent of monomeric units of a polar acrylic compound, (C) 5 to 40 weight percent of monomeric units of a high glass transition temperature macromonomer having a glass transition temperature of 20° C. or above and (D) 1 to 40 weight percent of monomeric units of a low glass transition temperature macromonomer having a glass transition temperature of below 20° C. wherein the sum of the content of the component (C) and the content of the component (D) is in the range from 6 to 50 weight percent.

The blister resistant pressure sensitive adhesive sheet of the invention also comprises a substrate and an adhesive composition which is coated on the surface of the substrate and comprises as the main component thereof a copolymer comprising (A) 30 to 93 weight percent of monomeric units of an acrylic ester, (B) 1 to 30 weight percent of monomeric units of a polar acrylic compound, (C) 5 to 40 weight percent of monomeric units of a high glass transition temperature macromonomer having a glass transition temperature of 20° C. or above, (D) 1 to 40 weight percent of monomeric units of a low Tg macromonomer having Tg of below 20° C. and (E) 0.1 to 20 weight percent of monomeric units of an oligomer having telechelic thiol functional groups wherein the sum of the content of the component (C) and the content of the component (D) is in the range from 6 to 50 weight percent.

Other and further objects, features and advantages of the invention will appear more fully from the following description.

DETAILED DESCRIPTION OF THE INVENTION

The present invention has been completed as a result of the extensive investigations undertaken with an object of providing a pressure sensitive adhesive sheet having excellent adhesive strength, resistance against formation of blisters and removability on heating and after heating, leading to a discovery that a pressure sensitive adhesive sheet comprising a coating layer having as the main component thereof a copolymer comprising monomer units of acrylic ester, monomer units of polar acrylic compound, monomer units of a high glass transition temperature (Tg) macromonomer having a Tg of 20° C. or above and monomer units of a low Tg macromonomer having a Tg of below 20° C. in a specific ratio has excellent resistance against formation of blisters and, at the same time, excellent removability on heating and after heating, that the copolymer can be prepared by copolymerization efficiently without gelation even at higher monomer concentrations when a telechelic oligomer having thiol functional groups of a high chain transfer constant at the two ends is present during the polymerization process to prepare the copolymer and that a pressure sensitive adhesive sheet comprising a coating layer having as the main component thereof the copolymer prepared in the presence of the telechelic oligomer has also excellent resistance against formation of blisters and, at the same time, excellent removability on heating and after heating.

The present invention provides a blister resistant pressure sensitive adhesive sheet comprising a substrate and an adhesive composition which is coated on the surface of the substrate and comprises as the main component thereof a copolymer comprising (A) 30 to 93 weight percent of monomeric units of an acrylic ester, (B) 1 to 30 weight percent of monomeric units of a polar acrylic compound, (C) 5 to 40 weight percent of monomeric units of a high glass transition temperature macromonomer having a glass transition temperature of 20° C. or above and (D) 1 to 40 weight percent of monomeric units of a low glass transition temperature macromonomer having a glass transition temperature of below 20° C. wherein the sum of the content of the component (C) and the content of the component (D) is in the range from 6 to 50 weight percent.

The present invention also provides a blister resistant pressure sensitive adhesive sheet comprising a substrate and an adhesive composition which is coated on the surface of the substrate and comprises as the main component thereof a copolymer comprising (A) 30 to 93 weight percent of monomeric units of an acrylic ester, (B) 1 to 30 weight percent of monomeric units of a polar acrylic compound, (C) 5 to 40 weight percent of monomeric units of a high glass transition temperature macromonomer having a glass transition temperature of 20° C. or above, (D) 1 to 40 weight percent of monomeric units of a low Tg macromonomer having Tg of below 20° C. and (E) 0.1 to 20 weight percent of monomeric units of an oligomer having telechelic thiol functional groups wherein the sum of the content of the component (C) and the content of the component (D) is in the range from 6 to 50 weight percent.

The pressure sensitive adhesive sheet of the invention comprises a substrate and a coating layer of an adhesive composition. The copolymer which constitutes the main component of the adhesive composition comprises (A) monomeric units of an acrylic ester, (B) monomeric units of a polar acrylic compound, (C) monomeric units of a high Tg macromonomer having a Tg of 20° C. or above and (D) monomeric units of a low Tg macromonomer having Tg of below 20° C. The copolymer may also comprise (E) monomeric units of an oligomer having telechelic thiol functional groups.

The acrylic ester utilized for the component (A) is an ester of acrylic acid or methacrylic acid with an alcohol having 1 to 14 carbon atoms. Examples of the ester of acrylic acid or methacrylic acid are alkyl esters prepared from acrylic acid or methacrylic acid and an alcohol having an alkyl group of 1 to 14 carbon atoms, such as methanol, ethanol, n-propanol, isopropanol, n-butanol, isobutanol, n-pentanol, 2-pentanol, 3-pentanol, 2-methyl-1-butanol, 3-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-ethylhaxanol, n-decanol, n-dodecanol and the like. Preferable examples of the ester of acrylic acid are n-butyl acrylate and 2-ethylhexyl acrylate. For the component (A), either a single kind of the acrylic ester or a combination of two or more kinds of the acrylic ester may be utilized.

The polar acrylic compound utilized for the component (B) is an acrylic monomer comprising as the polar group one or more than one groups of at least one kind selected from the group consisting of carboxyl group, hydroxyl group, amino group, amide group, epoxy group, cyano group and isocyanate group. Examples of the polar acrylic compound are compounds having polar groups which form side chain polar groups attached to the polymer main chain when the compounds are polymerized, such as (meth)acrylic acid, 2-hydroxyethyl (meth)acrylate, 2-aminoethyl (meth)acrylate, (meth)acrylamide, glycidyl (meth)acrylate, (meth)acrylonitrile, 2-isocyanoethyl (meth)acrylate, itaconic acid, maleic acid and the like. For the component (B), either a single kind of the polar acrylic compound or a combination of two or more kinds of the polar acrylic compound may be utilized.

The high Tg macromonomer having Tg of 20° C. or above utilized for the component (C) is a macromonomer comprising a polymeric chain having Tg of 20° C. or above and a polymerizable functional group at an end of the polymeric chain. Examples of the polymeric chain having Tg of 20° C. or above are homopolymers or copolymers of styrene derivatives, such as styrene, 4-n-butylstyrene, 4-t-butylstyrene, 2,4-diisopropylstyrene, 2,5-dimethylstyrene, 3,4-diethylstyrene, 2-hydroxymethylstyrene, 4-methylstyrene, 2-methylstyrene and the like; methacrylic esters, such as methyl methacrylate, ethyl methacrylate, n-propyl methacrylate, isopropyl methacrylate, t-butyl methacrylate, sec-butyl methacrylate, isobutyl methacrylate, 3,3-dimethylbutyl methacrylate, cyclohexyl methacrylate, N,N-diisopropylaminoethyl methacrylate, 2-cyanoethyl methacrylate, glycidyl methacrylate, isobornyl methacrylate, phenyl methacrylate and the like; acrylic esters, such as phenyl acrylate, n-hexadecyl acrylate, isobornyl acrylate and the like; vinyl acetate; acrylonitrile; methacrylonitrile; N,N-dimethylacrylamide; vinyl pyrrolidone and the like monomers, having Tg of 20° C. or above. For the component (C), either a single kind of the high Tg macromonomer or a combination of two or more kinds of the high Tg macromonomer may be utilized. Other monomers which give homopolymers having a Tg of below 20° C., such as n-butyl acrylate, ethyl acrylate, 2-ethylhexyl acrylate and the like, may be utilized in combination with the above monomers to form the high Tg macromonomer when the Tg of the resultant macromonomer of the component (C) is not in the range below 20° C. Preferable examples of the polymeric chain are a homopolymer of styrene, a homopolymer of methyl methacrylate and a copolymer of styrene and acrylonitrile.

The polymeric chain having a Tg of 20° C. or above preferably has a molecular weight in the range from 1,000 to 30,000 and a Tg in the range from 30° to 250° C. More preferably, the polymeric chain has a molecular weight in the range from 3,000 to 15,000 and a Tg in the range from 60° to 150° C.

The kind of the polymerizable functional group at an end of the polymeric chain in the high Tg macromonomer is not particularly limited so long as the polymerizable functional group can copolymerize with the acrylic ester utilized for the component (A) and the polar acrylic compound utilized for the component (B). Examples of the polymerizable functional group are methacryloyl group, allyl group, vinylbenzyl group and the like.

A graft copolymer having the polymeric chain of the high Tg macromonomer in the side chain can easily be prepared by copolymerization of the macromonomer having a polymeric chain and a polymerizable functional group at an end of the polymeric chain with the acrylic ester and the polar acrylic compound. The resistance to formation of blisters is exhibited through the absorption of a small amount gas emitted from the resin substrate by the side chain component of the copolymer.

The method of preparation of the macromonomer is not particularly limited but various kinds of conventional methods can be utilized. Examples of such conventional methods are (1) preparation of a living polymer anion which constitutes polymeric chain of the macromonomer, followed by reaction of methacrylic chloride with the polymer anion; (2) preparation of an oligomer having a terminal carboxyl group by radical polymerization of a monomer, such as methyl methacrylate, in the presence of mercaptoacetic acid as the chain transfer agent, followed by reaction with glycidyl methacrylate and the like; (3) preparation of an oligomer having a terminal hydroxyl group by using mercaptoethanol as the chain transfer agent, followed by reaction with hydroxyethyl methacrylate to make a macromonomer; (4) radical polymerization of an acrylic monomer in the presence of a mercaptane chain transfer agent having polymerizable functional group; and (5) ionic polymerization of a vinyl monomer having a carbonyl group or a cyano group by using vinylphenylketene methyltrimethylsilyl acetal as the initiator and a fluorine compound as the coinitiator.

The low Tg macromonomer having Tg of below 20° C. utilized for the component (D) is a macromonomer comprising a polymeric chain having Tg of below 20° C. and a polymerizable functional group at an end of the polymeric chain. Examples of the polymeric chain having Tg of below 20° C. are polymers of vinyl ethers, such as methyl vinyl ether, butyl vinyl ether and the like; polymers of cyclic ethers, such as ethylene oxide, propylene oxide and the like; polymers of siloxanes, such as hexamethylcyclotrisiloxane, hexaphenylcyclotrisiloxane and the like; polymers of (meth)acrylic esters, such as 2-methoxyethyl acrylate, 1H,1H,9H-hexadecafluorononyl methacrylate and the like; and like other polymers. Preferable examples of the polymeric chain are polymers of siloxane monomers which give dimethyl siloxane polymeric chain.

Preferably, the polymeric chain having a Tg of below 20° C. has a molecular weight in the range from 1,000 to 50,000 and a Tg in the range −170° to 10° C. More preferably, the polymeric chain has a molecular weight in the range from 3,000 to 15,000 and a Tg in the range from −140° to −30° C.

The kind of the polymerizable functional group at an end of the polymeric chain in the low Tg macromonomer is not particularly limited so long as the polymerizable functional group can copolymerize with the acrylic ester utilized for the component (A) and the polar acrylic compound utilized for the component (B). Examples of the polymerizable functional group are methacryloyl group, allyl group, vinylbenzyl group and the like.

A graft copolymer having the polymeric chain of the low Tg macromonomer in the side chain can easily be prepared by copolymerization of the macromonomer having a polymeric chain and a polymerizable functional group at an end of the polymeric chain with the acrylic ester and the polar acrylic compound. The excellent removability on heating and after heating is exhibited through the action of the low Tg side chain in the copolymer.

The method of preparation of the low Tg macromonomer is not particularly limited but various kinds of conventional methods can be utilized. When the polymeric chain is polysiloxane, a preferable example of such conventional methods is preparation of the living polymer anion to constitute the polymeric chain, followed by the reaction of methacrylic chloride with the living polymer anion. When the polymeric chain is acrylic polymer, the methods utilized for the preparation of the macromonomer in the component (C) can be utilized.

When the side chain of the copolymer comprises the polymeric chain of high Tg macromonomer having a Tg of 20° C. or above alone and does not comprise the polymeric chain of low Tg macromonomer, the pressure sensitive adhesive sheet prepared does not have satisfactory removability on heating and after heating even though it has excellent resistance against formation of blisters. On the other hand, when the side chain of the copolymer comprises the polymeric chain of low Tg macromonomer having a Tg of below 20° C. alone and does not comprise the high Tg macromonomer, the pressure sensitive adhesive sheet prepared does not have satisfactory resistance against formation of blisters even though it has excellent removability on heating and after heating.

The contents of the components in the copolymer are in the range from 30 to 93 weight % for the component (A) which is monomeric units of an acrylic ester, in the range from 1 to 30 weight % for the component (B) which is monomeric units of a polar acrylic compound, in the range from 5 to 40 weight % for the component (C) which is monomeric units of a high Tg macromonomer having a Tg of 20° C. or above, in the range from 1 to 40 weight % for the component (D) which is monomeric units of a low Tg macromonomer having a Tg of below 20° C. and in the range from 6 to 50 weight % for the sum of the component (C) and the component (D).

The content of the components in the copolymer is preferably in the range from 40 to 80 weight % for the component (A) which is monomeric units of an acrylic ester, in the range from 2 to 15 weight % for the component (B) which is monomeric units of a polar acrylic compound, in the range from 10 to 25 weight % for the component (C) which is monomeric units of a high Tg macromonomer having a Tg of 20° C. or above, in the range from 2 to 25 weight % for the component (D) which is monomeric units of a low Tg macromonomer having a Tg of below 20° C. and in the range from 10 to 40 weight % for the sum of the component (C) and the component (D).

The content of the components in the copolymer is more preferably in the range from 50 to 70 weight % for the component (A) which is monomeric units of an acrylic ester, in the range from 2 to 12 weight % for the component (B) which is monomeric units of a polar acrylic compound, in the range from 10 to 20 weight % for the component (C) which is monomeric units of a high Tg macromonomer having Tg of 20° C. or above, in the range from 2 to 20 weight % for the component (D) which is monomeric units of a low Tg macromonomer having Tg of below 20° C. and in the range from 15 to 30 weight % for the sum of the component (C) and the component (D).

When the content of the component (B) is less than 1 weight %, the adhesive property is not satisfactory. When the content of the component (C) is less than 5 weight %, the resistance against formation of blisters of the pressure sensitive adhesive sheet prepared is not satisfactory and, when the content of the component (C) is more than 40 weight %, the adhesive strength tends to be deteriorated. When the content of the component (D) is less than 1 weight %, the removability on heating and after heating is not satisfactory and, when the content of the component (D) is more than 40 weight %, the adhesive strength tends to be deteriorated. When the sum of the contents of the component (C) and the component (D) is less than 6 weight %, the resistance against formation of blisters is not satisfactory and, when the sum of the contents of the component (C) and the component (D) is more than 50 weight %, the adhesive strength tends to be deteriorated.

The copolymer of the invention has a weight average molecular weight in the range from 150,000 to 2,000,000, preferably in the range from 250,000 to 1,500,000 and more preferably in the range from 300,000 to 1,000,000. When the weight average molecular weight of the copolymer is smaller than 150,000, there arises the possibility that the holding power is insufficient. When the weight average molecular weight of the copolymer is larger than 2,000,000, workability, such as easiness of coating, tends to be deteriorated.

The copolymer of the invention has a glass transition temperature (Tg) in the range from −60° to 60° C., preferably in the range from −40° to 20° C., more preferably in the range from −30° to 20° C. When the Tg is below −60° C., the adhesive strength of the pressure sensitive adhesive sheet prepared is not satisfactory and, when the Tg is above 60° C., ball tack of the pressure sensitive adhesive sheet tends to be decreased.

Examples of the method of the preparation of the copolymer of the invention are (1) simultaneous copolymerization of an acrylic ester, a polar acrylic compound, a high Tg macromonomer having a Tg of 20° C. or above and a low Tg macromonomer having a Tg of below 20° C. in the presence of a radical polymerization initiator, such as azo-bis-isobutyronitrile; (2) copolymerization of acrylic ester with a polar acrylic compound having reactive functional groups, such as carboxyl group, hydroxyl group and the like to prepare a copolymer having reactive functional groups at the side chains, followed by the reaction of two kinds of macrosegment compounds which are a compound having a high Tg polymeric chain having a Tg of 20° C. or above and a compound having a low Tg polymeric chain having a Tg of below 20° C. and each of which has a reactive functional group reacting with the reactive functional groups in the copolymer prepared above, such as isocyanate group, hydroxyl group, carboxyl group and the like, at the end of the chain; (3) copolymerization of an acrylic ester, a polar acrylic compound and a compound having a group capable of initiating graft polymerization, such as a polymerizable organic peroxide, followed by graft polymerization of suitable compounds to form two kinds of branched chains which are a high Tg polymeric chain having a Tg of 20° C. or above and a low Tg polymeric chain having a Tg of below 20° C.; and the like other methods.

In the methods (2) and (3), the polymerization reaction of an acrylic ester and a polar acrylic compound is not directly involved. However, because the structure of the copolymer prepared by these methods is the same as the structure prepared by the method of direct copolymerization (1), the copolymer prepared by the method (2) or (3) can be included in the copolymer of the invention.

When the copolymer is prepared by the method (1), the polymerization may be conducted in the presence of the component (E) which is an oligomer having telechelic thiol functional groups at the both ends of the molecule according to desire. Because the macromonomers have molecular weights in the range from 1,000 to 50,000 or in the range from 1,000 to 30,000, the molecular weight of the copolymer increases remarkably even by the addition of a single molecule of the macromonomer and the copolymer has tendency to gelatinize rather easily. Because of this reason, the polymerization is conducted usually at a monomer concentration in the range from about 20 to about 30 weight %.

When the oligomer having telechelic thiol functional groups of a high chain transfer rate constant at the both ends of the molecule is present in the polymerization system, the copolymer prepared in the system is not gelatinized even at a monomer concentration in the range from about 50 to about 60 weight % and the desired copolymer can be prepared efficiently. Furthermore, the copolymer thus prepared gives a pressure sensitive adhesive sheet having excellent resistance against formation of blisters and removability just like the copolymer prepared in the absence of the thiol telechelic oligomer.

The amount of the oligomer having telechelic thiol functional groups at the both ends of the molecule utilized in the invention is selected so as to make the content of the monomeric units of the oligomer in the copolymer is in the range from 0.1 to 20 weight %, preferably in the range from 0.1 to 15 weight % and more preferably in the range from 0.1 to 10 weight %. When the content of the monomeric units of the oligomer in the copolymer is less than 0.1 weight %, polymerization can not be conducted at sufficiently high monomer concentrations. When the content of the monomeric units of the oligomer in the copolymer is more than 20 weight %, the resistance against formation of blisters tends to be decreased.

Examples of the oligomer having telechelic thiol functional groups at the both ends of the molecule are polydimethylsiloxane having thiol groups at the both ends of the molecule and molecular weight in the range from 1,000 to 10,000, polysulfide having thiol groups at the both ends of the molecule and molecular weight in the range from 1,000 to 10,000 and the like. The preferable example is the polydimethylsiloxane having thiol groups at the both ends of the molecule.

It can be shown that neither copolymers comprising styrene units or methyl methacrylate units in the main chain of the copolymer which are prepared by polymerization of mixtures of the acrylic ester, the polar acrylic compound and styrene or methyl methacrylate nor mixtures of copolymers of the acrylic ester and the polar acrylic compound with conventionally available polystyrene or polymethyl methacrylate exhibit resistance against formation of blisters which is one of the object of the invention.

This finding shows that, in the copolymer of the invention, the high Tg side chain having a Tg of 20° or above forms microdomains in the copolymer and the thus formed structure having micro phase separation appears to be effective for adsorption and diffusion of a small amount of gas emitted from the substrate resin which causes the formation of blisters.

The pressure sensitive adhesive sheet of the invention can be prepared by coating the adhesive composition comprising as the main component thereof the copolymer prepared according to the methods described above on the surface of a sheet of a substrate according to conventional methods of coating. Agents to prevent degradation, such as ultraviolet absorbents and antioxidants, may be added to the adhesive composition. Agents to crosslink the adhesive composition may also be added to the composition according to desire.

As the substrate for the pressure sensitive adhesive sheet, sheets and films of synthetic resins such as polyester, polyvinyl chloride, polypropylene, polyethylene, polyurethane and the like, synthetic papers, sheets and films of cellulosic materials, non-woven fabrics, woven fabrics and knit fabrics of various materials and the like other materials can be utilized. Suitable characters and figures may be printed on the side of the sheet which is not coated with the adhesive composition according to the application.

The pressure sensitive adhesive sheet of the invention is effectively utilized to apply on the surface of molded articles made of gas emitting resins which gives off small amounts of gas from the resin during a long time.

Many kinds of gas emitting resins have been known. Examples of resins which show remarkable formation of blisters are resins comprising 5 mol % or more, particularly 15 mol % or more, of aromatic ring, such as polystyrenic resins and polycarbonate resins, acrylic resins, such as polymethyl methacrylate, and polyolefin resins, such as polyethylene immediately after molding.

The polystyrenic resins described above are the resins which are prepared by using 10 weight % or more, particularly 30 weight % or more, of styrene in the material of the preparation. Examples of the polystyrenic resins are polystyrene resins, impact resistant polystyrene resins, acrylonitrile-butadiene-styrene resins, acrylonitrile-styrene resins, methyl methacrylate-butadiene-styrene resins, acrylic rubber-acrylonitrile-styrene resins, acrylonitrile-ethylene propylene rubber-styrene resins, acrylonitrile-chlorinated polyethylene-styrene resins, noryl resins and the like. A styrene monomer is considered to be emitted from the resins after the molding to cause the formation of blisters.

Resins comprising 5 mole % or more, particularly 15 mol % or more, of aromatic ring emits gas to cause the formation of blisters because the resins tend to absorb moisture or other low molecular weight compounds even though they do not comprise any styrene monomer unit. Resins comprising polar groups at the side chains, such as acrylic resins, emits gas to cause the formation of blisters because of the same kind of phenomena.

Polyolefins resins, such as polyethylene, emits gas to cause the formation of blisters immediately after the molding even though they do not emit gas under normal conditions of application. The pressure sensitive adhesive sheet of the invention can be applied to the polyolefin resins immediately after the molding without formation of blisters.

The pressure sensitive adhesive sheet of the invention is, for example, favorably applied to resin plates for window panes, such as polycarbonate resin plates, polymethyl methacrylate resin plates and polystyrene resin plates having good transparency. When a conventional pressure sensitive adhesive sheet is applied to polycarbonate resin plates and polymethyl methacrylate resin plates for window panes for the purpose of adjustment of sun light transmission or prevention of scratches at the surface, blisters are particularly remarkable when they are formed. When a pressure sensitive adhesive sheet is applied to molded articles of transparent polystyrenic resins as a label, blisters are also particularly remarkable when they are formed. Formation of blisters on casings made of polystyrene for magnetic tape and the like is a big problem in the current market.

The pressure sensitive adhesive sheet of the invention is particularly advantageous for applications to such resins as described above.

DESCRIPTION OF THE PREFERRED EMBODIMENTS

The invention will be understood more readily with reference to the following examples; however these examples are intended to illustrate the invention and are not to be construed to limit the scope of the invention.

Properties of the pressure sensitive adhesive sheet were evaluated by the following methods.

(1) Ball tack

Ball tack was measured according to J. Dow's method (Japanese Industrial Standard Z-0237), and shown by the ball number of the largest stopped ball.

(2) Probe tack

Probe tack was measured by using a probe tack tester manufacture by Rigaku Kogyo Co., Ltd. A column of 5 mm diameter made of stainless steel was pressed against pressure sensitive adhesive sheet for 1 second at the pressure of 100 g and pulled downward at the speed of 1 cm/second. The force required to pull the column was shown in gram.

(3) Adhesive strength

Adhesive strength when the sample was peeled at 180° angle was measured according to the method of Japanese Industrial Standard Z-0237 and shown by the value of force in gram per 25 mm width.

A polycarbonate plate (a product of Nippon Test Panel Co., Ltd., having thickness of 2 mm) was used as the substrate and the adhesive strength was measured after 24 hours of application of the pressure sensitive adhesive sheet to the substrate.

(4) Holding power

Holding power was measured at 40° C. under the loading of 1 kg according to Japanese Standard Z-0237 and shown by the time before dropping in second.

(5) Resistance to formation of blisters

To a transparent polycarbonate plate (a product of Nippon Test Panel Co., Ltd., having thickness of 2 mm) water containing 0.1 weight % of a surface active agent was sprayed and then a pressure sensitive adhesive sheet was applied. The pressure sensitive adhesive sheet was pressed to the plate by a squeezee while squeezing out water on the plate. After the plate with the pressure sensitive adhesive sheet was left standing for 30 minutes, it was heated for acceleration by standing for 1 hour in a heated air drying oven at 80° C. and the formation of blisters was evaluated by visual observation. The result of the evaluation is expressed by the following notations:

excellent: no formation of blisters was found.
good: small bubbles were found by a magnifying glass in small numbers but no lifting was found.
poor: bubbles and liftings were found all over.

(6) Removability

The test pieces served for the test of resistance against formation of blisters were used for evaluation and the pressure sensitive adhesive sheet applied to the substrate plate was peeled off from the substrate plate. The result of the evaluation is expressed by the following notations:

good: the pressure sensitive adhesive sheet was peeled off from the substrate plate without any adhesive material remaining on the substrate plate.
poor: the pressure sensitive adhesive sheet was peeled off from the substrate plate with all of the adhesive material remaining on the substrate plate.

Abbreviations and trade names used in the examples are listed in the following.

BA: butyl acrylate
2EHA: 2-ethylhexyl acrylate
AA: acrylic acid
AA-6 ®: polymethyl methacrylate having a methacryloyl group on one end of the molecule and having Tg of 105° C. (a product of Toa Gosei Co., Ltd.)
C-4500 ®: polystyrene having a methacryloyl group on one end of the molecule and having Tg of 100° C. (a product of Sartomer Co., Ltd.)
FM0721 ®: polydimethylsiloxane having a methacryloyl group on one end of the molecule and having Tg of −127° C. (a product of Chisso Co., Ltd.)
X-22-167 ®: polydimethylsiloxane having thiol groups on the both ends of the molecule and having molecular weight of 4,500 (a product of Shinetsu Kagaku Kogyo Co., Ltd.)
LP-55 ®: polysulfide having thiol groups on the both ends of the molecule and having molecular weight of 4,000 (a product of Toray Thiocol Co., Ltd.)

EXAMPLE 1

Into a 500 ml four necked flask equipped with a reflux condenser, an inlet for nitrogen, a thermometer and a stirrer, 70 g of butyl acrylate, 5 g of acrylic acid, 15 g of AA-6, 5 g of FM0721, 5 g of X-22-167C, 0.53 g of α,α'-azo-bis-isobutyronitrile and 92 g of ethyl acetate was charged. After the mixture was stirred for 30 minutes under nitrogen stream, the mixture was heated to 60° C. and allowed to react for 24 hours in the same condition.

The solution of polymer thus prepared was transparent and had a viscosity of 3,200 cps when the polymer concentration was 52 weight %. The polymer had the weight average molecular weight of 470,000.

The polymer solution was applied on a polyester film of 50 μm thickness to form a coating layer having average coating material of 20±2 g/m². A pressure sensitive adhesive sheet was prepared by drying the film coated with the adhesive layer at 100° C. for 1 minute by hot air stream and evaluated.

The composition of the charged monomers are shown in Table 1 and the results of the evaluation of the pressure sensitive adhesive sheet are listed in Table 2.

EXAMPLES 2 THROUGH 9 AND COMPARATIVE EXAMPLES 1 THROUGH 3

Pressure sensitive adhesive sheets were prepared by the same method as in Example 1 except that the compositions of charged monomers were changed as shown in Table 1. The results of the evaluation are listed in Table 2.

It is clearly shown in the Examples and Comparative examples that the pressure sensitive adhesive sheet of the invention has excellent resistance against formation of blisters and removability on heating and after heating as well as excellent adhesive strength and holding power.

While the invention has been particularly shown and described with reference to preferred embodiments thereof, it will be understood by those skilled in the art that the foregoing and other changes in form and details can be made therein without departing from the spirit and scope of the invention.

To summarize the advantages obtained by the invention, because the pressure sensitive adhesive sheet of the invention utilizes a specific copolymer in the adhesive layer, the formation of blisters is effectively prevented without any additional layer between the adhesive layer and the substrate sheet and the total thickness of the pressure sensitive adhesive sheet can be reduced. The pressure sensitive adhesive sheet of the invention has excellent removability on heating and after heating, weatherability and adhesive properties.

The copolymer which is comprised in the adhesive composition utilized for the pressure sensitive adhesive sheet can be prepared by copolymerization at high monomer concentrations by conducting the copolymerization in the presence of a thiol functional telechelic oligomer. Thus, the copolymer can be prepared efficiently and the pressure sensitive adhesive sheet can be prepared economically.

Because of the excellent characteristics of the pressure sensitive adhesive sheet of the invention, the pressure sensitive adhesive sheet can be favorably applied to various kinds of molded resin articles, particularly to molded articles of polycarbonate resins and polystyrene resins. When the pressure sensitive adhesive sheet of the invention is applied, the adhesive face has excellent weatherability without any formation of blisters and the adhesive strength and beautiful appearance are retained for a long time.

TABLE 1

| Example | Composition of the charged monomers (g) | | | | | | | | | | Monomer concentration (weight %) |
|---|---|---|---|---|---|---|---|---|---|---|---|
| | A | | B | | C | | D | | E | | |
| | kind | quantity | kind | quantity | kind | quantity | kind | quantity | kind | quantity | |
| 1 | BA | 70 | AA | 5 | AA-6 | 15 | FM0721 | 5 | X-22-167C | 5 | 52 |
| 2 | BA | 70 | AA | 10 | AA-6 | 12 | FM0721 | 6 | X-220167C | 2 | 50 |
| 3 | BA | 70 | AA | 10 | C-4500 | 10 | FM0721 | 9 | X-22-167C | 1 | 50 |
| 4 | BA | 50 | AA | 10 | AA-6 | 10 | FM0721 | 20 | X-22-167C | 10 | 51 |
| 5 | 2EHA | 70 | AA | 12 | AA-6 | 14 | FM0721 | 2 | X-22-167C | 2 | 48 |
| 6 | BA | 70 | AA | 5 | AA-6 | 15 | FM0721 | 5 | LP-55 | 5 | 57 |
| 7 | BA | 70 | AA | 10 | AA-6 | 15 | FM0721 | 5 | X-22-167C | 0 | 30 |
| 8 | BA | 70 | AA | 5 | AA-6 | 10 | FM0721 | 15 | X-22-167C | 0 | 18 |
| 9 | BA | 68 | AA | 2 | AA-6 | 15 | FM0721 | 15 | X-22-167C | 0 | 25 |
| Comparative example 1 | BA | 70 | AA | 0 | AA-6 | 10 | FM0721 | 20 | X-22-167C | 0 | 20 |
| Comparative example 2 | BA | 70 | AA | 10 | AA-6 | 0 | FM0721 | 20 | X-22-167C | 0 | 22 |
| Comparative Example 3 | BA | 70 | AA | 10 | AA-6 | 20 | FM0721 | 0 | X-22-167C | 0 | 30 |

TABLE 2

| Example | Characteristics of the pressure sensitive adhesive sheet | | | | | |
|---|---|---|---|---|---|---|
| | ball tack | probe tack | adhesive strength (g/25 mm) | holding power (sec) | resistance against formation of blisters | removability |
| 1 | 2 | 110 | 1,660 | 70,000< | excellent | good |
| 2 | <2 | 40 | 1,000 | 70,000< | excellent | good |
| 3 | <2 | 60 | 930 | 70,000< | excellent | good |
| 4 | <2 | 20 | 530 | 9,680 | good | good |
| 5 | <2 | 30 | 920 | 70,000< | good | good |
| 6 | 2 | 80 | 1,400 | 70,000< | good | good |
| 7 | <2 | 50 | 1,060 | 70,000< | excellent | good |
| 8 | 4 | 190 | 840 | 70,000< | good | good |
| 9 | 4 | 80 | 640 | 70,000< | excellent | good |
| Comparative example 1 | 4 | 100 | 40 | 70,000< | excellent | good |
| Comparative example 2 | <2 | 60 | 1,100 | 70,000< | poor | good |
| Comparative | <2 | 20 | 760 | 70,000< | excellent | poor |

TABLE 2-continued

| | Characteristics of the pressure sensitive adhesive sheet | | | | |
|---|---|---|---|---|---|
| Example | ball tack | probe tack | adhesive strength (g/25 mm) | holding power (sec) | resistance against formation of blisters | removability |
| example 3 | | | | | | |

What is claimed is:

1. A blister resistant pressure sensitive adhesive sheet comprising a substrate and an adhesive composition which is coated on the surface of the substrate and comprises as the main component thereof a copolymer comprising (A) 30 to 93 weight percent of monomeric units of an acrylic ester, (B) 1 to 30 weight percent of monomeric units of a polar acrylic compound, (C) 5 to 40 weight percent of monomeric units of a high glass transition temperature macromonomer having a glass transition temperature of 20° C. or above, (D) 1 to 40 weight percent of monomeric units of a low Tg macromonomer having Tg of below 20° C. and (E) 0.1 to 20 weight percent of monomeric units of an oligomer having telechelic thiol functional groups wherein the sum of the content of the component (C) and the content of the component (D) is in the range from 6 to 50 weight percent.

2. A blister resistant pressure sensitive adhesive sheet as claimed in claim 1 wherein the copolymer comprises (A) 40 to 80 weight percent of monomeric units of an acrylic ester, (B) 2 to 15 weight percent of monomeric units of a polar acrylic compound, (C) 10 to 25 weight percent of monomeric units of a high glass transition temperature macromonomer having a glass transition temperature of 20° C. or above, (D) 2 to 25 weight percent of monomeric units of a low glass transition temperature macromonomer having a glass transition temperature of below 20° C. and (E) 0.1 to 15 weight percent of monomeric units of an oligomer having telechelic thiol functional groups wherein the sum of the content of the component (C) and the content of the component (D) is in the range from 10 to 40 weight percent.

3. The blister resistant pressure sensitive adhesive sheet as claimed in claim 1 wherein the acrylic ester utilized for the component (A) is an ester of acrylic acid or methacrylic acid with an alcohol having 1 to 14 carbon atoms.

4. The blister resistant pressure sensitive adhesive sheet as claimed in claim 1 wherein the acrylic ester utilized for the component (A) is n-butyl acrylate or 2-ethylhexyl acrylate.

5. The blister resistant pressure sensitive adhesive sheet as claimed in claim 1 wherein the polar acrylic compound utilized for the component (B) is an acrylic monomer comprising as the polar group one or more than two groups of at least one kind selected from the group consisting of carboxyl group, hydroxyl group, amino group, amide group, epoxy group, cyano group and isocyanate group.

6. The blister resistant pressure sensitive adhesive sheet as claimed in claim 1 wherein the polar acrylic compound utilized for the component (B) is (meth)acrylic acid, 2-hydroxyethyl (meth)acrylate, 2-aminoethyl (meth)acrylate, (meth)acrylamide, glycidyl (meth)acrylate, (meth)acrylonitrile, 2-isocyanoethyl (meth)acrylate, itaconic acid or maleic acid.

7. The blister resistant pressure sensitive adhesive sheet as claimed in claim 1 wherein the high transition temperature macromonomer having a glass transition temperature of 20° C. or above utilized for the component (C) comprises a polymer chain having a molecular weight in the range from 1,000 to 30,000 and a glass transition temperature in the range from 30° to 250° C. and terminal polymerizable functional groups.

8. The blister resistant pressure sensitive adhesive sheet as claimed in claim 1 wherein the low glass transition temperature macromonomer having a glass transition temperature of below 20° C. utilized for the component (D) comprises a polymer chain having a molecular weight in the range from 1,000 to 50,000 and a glass transition temperature in the range from −170° to 10° C. and terminal polymerizable functional groups.

9. The blister resistant pressure sensitive adhesive sheet as claimed in claim 1 wherein the polymer chain in the low glass transition temperature macromonomer having a glass transition temperature of below 20° C. utilized for the component (D) is polydimethylsiloxane.

10. The blister resistant pressure sensitive adhesive sheet as claimed in claim 1 wherein the oligomer having telechelic thiol functional groups utilized for the component (E) is polydimethylsiloxane or polysulfide having a molecular weight in the range from 1,000 to 10,000 and thiol groups at the two ends of the chain.

11. The blister resistant pressure sensitive adhesive sheet as claimed in claim 2 wherein the acrylic ester for (A) is an ester of acrylic acid or methacrylic acid with an alcohol having 1 to 14 carbon atoms.

12. The blister resistant pressure sensitive adhesive sheet as claimed in claim 2 wherein the acrylic ester for (A) is selected from the group consisting of n-butyl acrylate and 2-ethylhexyl acrylate.

13. The blister resistant pressure sensitive adhesive sheet as claimed in claim 11 wherein the polar acrylic compound for (B) is an acrylic monomer comprising as the polar group at least one polar group selected from the group consisting of a carboxyl group, a hydroxyl group, an amino group, an amide group, an epoxy group, a cyano group and an isocyanate group.

14. The blister resistant pressure sensitive adhesive sheet as claimed in claim 12 wherein the polar acrylic compound for (B) is selected from the group consisting of (meth)acrylic acid, 2-hydroxyethyl(meth)acrylate, 2-aminoethyl(meth)acrylate, (meth)acrylamide, glycidyl (meth)acrylate, (meth)acrylonitrile, 2-isocyanoethyl (meth)acrylate, itaconic acid and maleic acid.

15. The blister resistant pressure sensitive adhesive sheet as claimed in claim 13 wherein the high transition temperature macromonomer having a glass transition temperature of 20° C. or above for (C) comprises a polymer chain having a molecular weight of 1,000 to 30,000 and a glass transition temperature of 30° to 250° C. and terminal polymerizable functional groups.

16. The blister resistant pressure sensitive adhesive sheet as claimed in claim 15 wherein the low glass transition temperature macromonomer having a glass transition temperature of below 20° C. for (D) comprises a polymer chain having a molecular weight of 1,000 to 50,000 and a glass transition temperature of −170° to +10° C. and terminal polymerizable functional groups.

17. The blister resistant pressure sensitive adhesive sheet as claimed in claim 14 wherein the polymer chain in the low glass transition temperature macromonomer having a glass transition temperature of below 20° C. for (D) is polydimethylsiloxane.

18. The blister resistant pressure sensitive adhesive sheet as claimed in claim 17 wherein the oligomer having telechelic thiol functional groups for (E) is polydimethylsiloxane or polysulfide having a molecular weight of 1,000 to 10,000 and having thiol groups at the two ends of the chain.

19. The blister resistant pressure sensitive adhesive sheet as claimed in claim 18 wherein (C) has a polymer chain of a homopolymer of styrene, a homopolymer of methyl methacrylate or a copolymer of styrene and acrylonitrile.

20. The blister resistant pressure sensitive adhesive sheet as claimed in claim 19 wherein the substrate is selected from the group consisting of polyester, polyvinyl chloride, polypropylene, polyethylene and polyurethane.

* * * * *